(12) United States Patent
Böhler et al.

(10) Patent No.: US 8,484,475 B2
(45) Date of Patent: Jul. 9, 2013

(54) DATA TRANSMISSION METHOD, AND TACHOGRAPH SYSTEM

(75) Inventors: Detlef Böhler, Reichenau (DE); Thomas Grill, Villingen-Schwenningen (DE); Erwin Hess, Ottobrunn (DE); Bernd Meyer, München (DE); Horst Plankenhorn, Villingen-Schwenningen (DE)

(73) Assignee: Continental Automotive GmbH, Hannover (DE)

( * ) Notice: Subject to any disclaimer, the term of this patent is extended or adjusted under 35 U.S.C. 154(b) by 414 days.

(21) Appl. No.: 12/865,556

(22) PCT Filed: Jan. 7, 2009

(86) PCT No.: PCT/EP2009/050112
§ 371 (c)(1),
(2), (4) Date: Aug. 9, 2010

(87) PCT Pub. No.: WO2009/095286
PCT Pub. Date: Aug. 6, 2009

(65) Prior Publication Data
US 2010/0322423 A1    Dec. 23, 2010

(30) Foreign Application Priority Data
Jan. 30, 2008    (DE) .......................... 10 2008 006 840

(51) Int. Cl.
*H04L 9/28*    (2006.01)
*G01P 15/00*    (2006.01)
*G06F 19/00*    (2011.01)

(52) U.S. Cl.
USPC ........... 713/175; 713/156; 713/176; 380/259; 701/70; 702/141

(58) Field of Classification Search
USPC ..................... 701/35, 400, 517; 713/193, 194
See application file for complete search history.

(56) References Cited

U.S. PATENT DOCUMENTS 4,804,937 A * 2/1989 Barbiaux et al. .............. 340/459
5,583,383 A * 12/1996 Denz et al. ................... 307/10.2
(Continued)

FOREIGN PATENT DOCUMENTS

DE    10 2004 043 052 B3    1/2006
RU    2003/131267 A    4/2005
(Continued)

OTHER PUBLICATIONS

International Standard, ISO 16844-3:2004(E); "Road vehicles—Tachograph systems-"; Part 3: "Motion sensor interface"; first edition: Nov. 1, 2001 (Known from own searching).

(Continued)

*Primary Examiner* — Christopher Revak
(74) *Attorney, Agent, or Firm* — Cozen O'Connor

(57) ABSTRACT

In a data transmission method for a tachograph system, digital messages are transmitted between a speed transmitter (MS) and a recording unit (RU). The digital messages contain a pair of keys including a public key (KMP, KRP) and a private key (KMS, KRS), as well as a certificate (ZM, ZR) derived from the respective pair of keys. The public keys (KMP, KRP) and the certificates (ZM, ZR) are mutually verified between the recording unit (RU) and the speed transmitter (MS). If the verification is positive, the speed transmitter (MS) detects sensor data, and a digital message is generated therefrom. In addition, the speed transmitter (MS) generates authentication data for the message in accordance with the pair of keys (KMP, KMS) thereof. The message and the authentication data are transmitted to the recording unit and are processed there in accordance with a validity of the authentication data verified by the recording unit (RU).

15 Claims, 5 Drawing Sheets

U.S. PATENT DOCUMENTS

| | | | |
|---|---|---|---|
| 7,117,075 B1 * | 10/2006 | Larschan et al. | 701/29.6 |
| 7,333,632 B2 * | 2/2008 | Lewiner et al. | 382/104 |
| 7,520,002 B2 | 4/2009 | Naether | |
| 7,596,692 B2 * | 9/2009 | Fox et al. | 713/155 |
| 7,659,827 B2 * | 2/2010 | Gunderson et al. | 340/576 |
| 2002/0007457 A1 | 1/2002 | Neff | |
| 2002/0072963 A1 * | 6/2002 | Jonge | 705/13 |
| 2003/0039361 A1 | 2/2003 | Hawkes et al. | |
| 2004/0187001 A1 | 9/2004 | Bousis | |
| 2006/0294366 A1 | 12/2006 | Nadalin et al. | |
| 2007/0113071 A1 * | 5/2007 | Lindinger et al. | 713/156 |
| 2007/0116282 A1 | 5/2007 | Hawkes | |
| 2008/0059701 A1 * | 3/2008 | Esfandabadi | 711/115 |
| 2008/0142671 A1 * | 6/2008 | Bourrieres et al. | 248/551 |
| 2009/0327760 A1 * | 12/2009 | Lindinger et al. | 713/193 |
| 2010/0004813 A1 * | 1/2010 | Lindinger et al. | 701/33 |
| 2010/0075633 A1 * | 3/2010 | Lydike et al. | 455/411 |
| 2010/0100749 A1 * | 4/2010 | Gerber et al. | 713/193 |
| 2010/0191413 A1 * | 7/2010 | Fritsch et al. | 701/34 |
| 2011/0035139 A1 * | 2/2011 | Konlditslotis et al. | 701/119 |
| 2011/0119013 A1 * | 5/2011 | Onea et al. | 702/96 |
| 2011/0299679 A1 * | 12/2011 | Yamaguchi et al. | 380/44 |
| 2012/0016623 A1 * | 1/2012 | Hayner | 702/141 |

FOREIGN PATENT DOCUMENTS

| | | |
|---|---|---|
| RU | 2 295 202 C2 | 3/2007 |
| RU | 2295202 C2 | 3/2007 |
| WO | WO 9713208 A1 * | 4/1997 |
| WO | WO 2008/007323 | 1/2008 |
| WO | WO 2008/007323 A2 | 1/2008 |

OTHER PUBLICATIONS

Wikipedia-Eintrag "Public-Key-Infrastruktur", Jan. 18, 2008; (online abrufbar über: http://de.wikipedia.org/w/index.php?title=Public-Key-Infrastruktur&oldid=41360209).

Angewandte Kryptographie: Protokolle, Algoithmen and Sourcecode in C/ Bruce Schneier.—Bonn (u.a.):Addison-Wesley; (1996/1999); ISBN: 3-89319-854-7.

TCP/IP Tutorail and Technical Overview; Adolfo Rodriguez, John Garell, John Karas, Roland Peschke; ibm.com/redbooks; Aug. 2001.

* cited by examiner

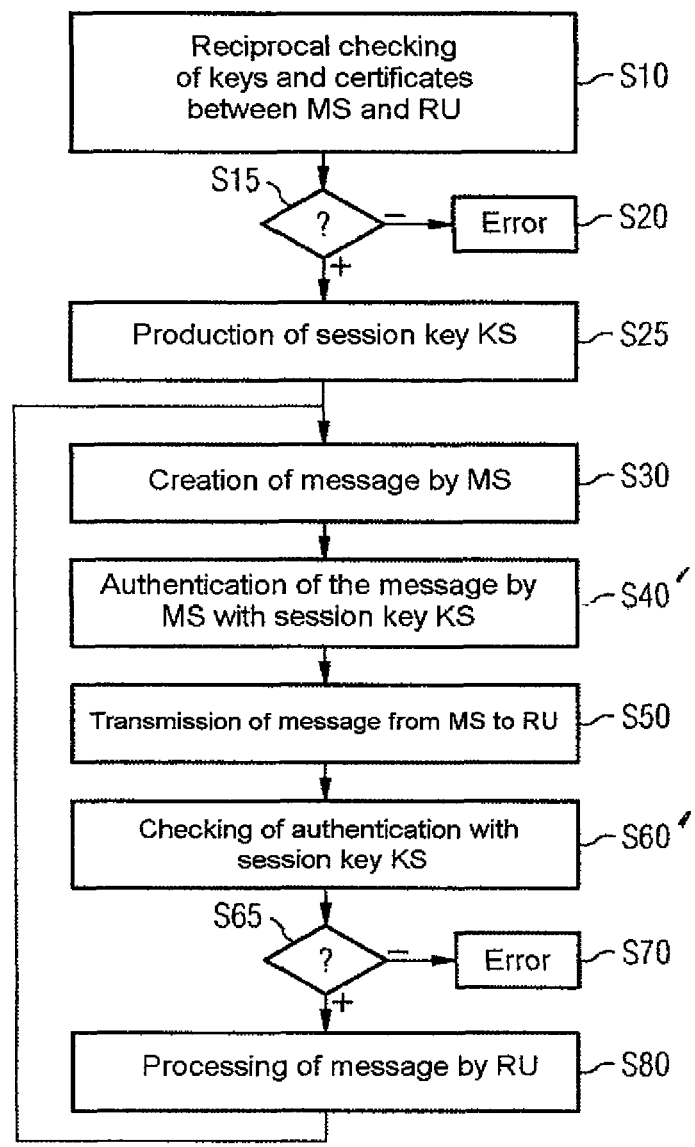

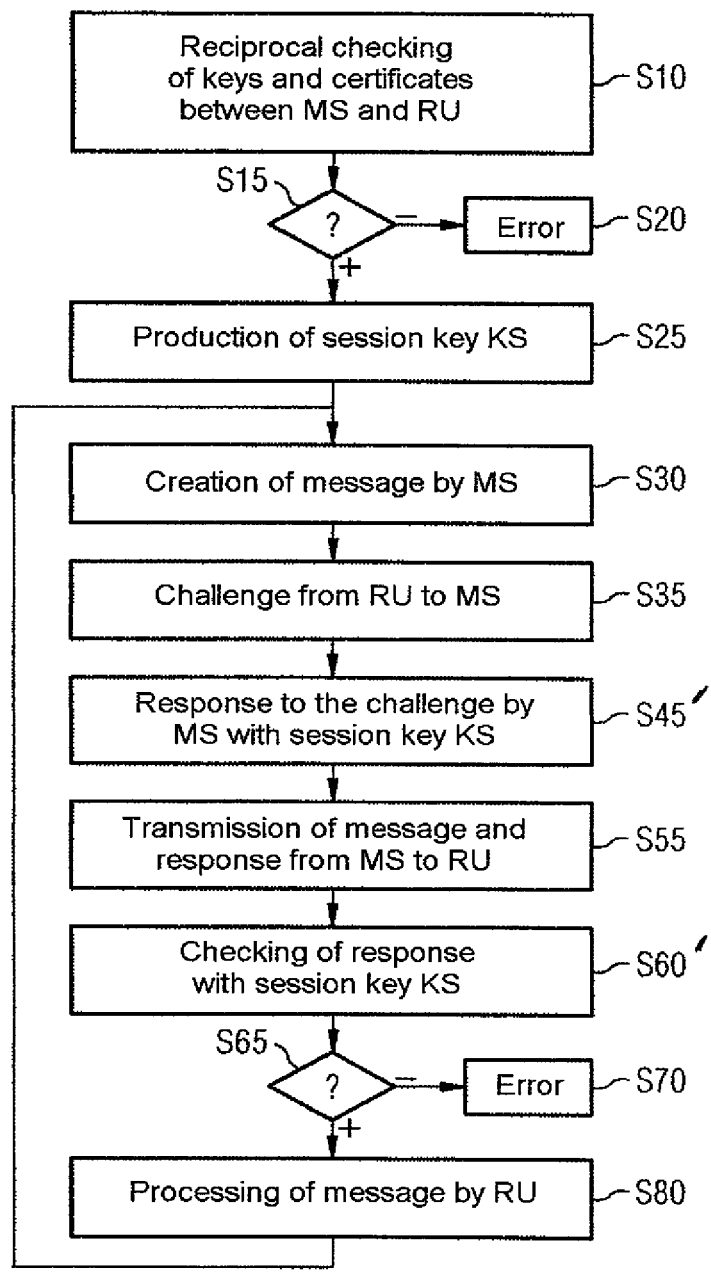

DATA TRANSMISSION METHOD, AND TACHOGRAPH SYSTEM

PRIORITY CLAIM

This is a U.S. national stage of Application No. PCT/EP2009I050112, filed on Jan. 7, 2009, which claims priority to German Application No: 10 2008 006 840.3, filed: Jan. 30, 2008 the contents of which are incorporated herein by reference.

BACKGROUND OF THE INVENTION

1. Field of the Invention

The invention relates to a data transmission method and a tachograph system for the transmission of digital messages between a velocity transmitter and a recording unit. The invention also relates to a tachograph system having a velocity transmitter and a recording unit.

2. Related Art

Tachographs or tachograph systems are usually monitoring appliances provided in a motor vehicle, particularly in a goods or passenger transportation vehicle, to allow monitoring of the activities of a driver of the vehicle. In this case, a tachograph has the function of recording, processing and storing driver data for activities of a driver of the vehicle in order to allow these activities to be monitored by an inspector.

Earlier tachographs with printable disks have been replaced by electronic tachographs with digital data storage, referred to as digital tachographs. In Europe, digital tachographs of this kind are also stipulated in newly licensed vehicles for goods transport, for example.

During operation of the vehicle, the tachograph system records, stores and processes vehicle operating parameters, particularly velocities and driving times, but also other information. In this case, velocity data is transmitted from a velocity transmitter to a recording unit, where they are evaluated and stored. On the one hand, this may involve the transmission of signal pulses, produced by a magnet sensor on a drive shaft, and correspond to one particular revolution of the drive shaft.

These signal pulses can accordingly be used to ascertain a velocity. In addition, it is also possible for a counter reading for the aforementioned signal pulses to be transmitted at particular times in order to keep this counter reading in sync in the velocity transmitter and in the recording unit.

To prevent manipulations in the transmission which feign an incorrect velocity, it is particularly possible for the counter reading to be transmitted using a cryptography method. Today, this involves the use of symmetric cryptography methods, with a symmetric session key being generated from module-individual information based on a general secret key, which is also called a master key. The general secret key is the same for all appliances and is known to the appliances only when a connection is set up for initializing purposes, what is known as pairing. If the secret master key is compromised, the integrity of all tachograph systems which use this key is endangered.

SUMMARY OF THE INVENTION

It is an object of one embodiment of the invention to specify a data transmission method for a tachograph system and a tachograph system having a velocity transmitter and a recording unit which have low computation complexity for authentic data transmission and ensure a relatively high level of system security.

In one embodiment of a data transmission method for a tachograph system for the transmission of digital messages between a velocity transmitter and a recording unit, the velocity transmitter and the recording unit each have a respective key pair with a public key and a private key and also a certificate derived from the respective key pair. The public key and the certificate of the velocity transmitter are transmitted from the velocity transmitter to the recording unit. Accordingly, the public key and the certificate of the recording unit are also transmitted from the recording unit to the velocity transmitter. The public key and the certificate of the velocity transmitter are checked by the recording unit, and the public key and the certificate of the recording unit are checked by the velocity transmitter. If the check is successful, authenticated data transmission can take place between the velocity transmitter and the recording unit. In this case, the velocity transmitter captures sensor data and produces a digital message therefrom. In addition, an authentication information item is produced for the message by the velocity transmitter on the basis of its key pair. Both the message and the authentication information item are transmitted from the velocity transmitter to the recording unit. The recording unit checks the validity of the authentication information item and, if it is valid, processes the transmitted message. By way of example, a velocity information item is calculated from the data transmitted in the message and is checked.

The asymmetric cryptography method with respective public and private keys and also associated certificates to confirm authenticity of the keys admittedly does not substantially reduce computation complexity for the creation and checking of the authentication information item of a respective message in comparison with conventional symmetric methods, but rather usually even increases it. The advantage of an asymmetric approach is that, in contrast to key management with keys which are standard throughout the system, compromising an individual secret key of a velocity transmitter or of a recording unit cannot adversely affect the security of the overall system.

Preferably, the key pairs of the recording unit and of the velocity transmitter are based on an elliptic curve cryptography system. Accordingly, the authentication information item is also produced and checked based on this cryptography system. This allows a further reduction in the computation complexity in the data transmission method of the tachograph system.

In one embodiment, the certificates of the recording unit and of the velocity transmitter are produced by a certification authority which is known to the recording unit and the velocity transmitter.

In one embodiment of the data transmission method, the production of the authentication information item involves the message being signed with the private key of the velocity transmitter. Accordingly, the validity of the authentication information item can be checked with the public key of the velocity transmitter in the recording unit.

In addition, the recording unit can transmit a challenge to the velocity transmitter, and the velocity transmitter can transmit to the recording unit a response, which is ascertained from the challenge by the velocity transmitter with its private key. In this case, a validity of the ascertained response can be checked by the recording unit with the public key of the velocity transmitter. The processing of the message is accordingly also dependent on the validity of the ascertained response.

In this embodiment, an authentication information item may comprise either a signature for the message or a valid response on the basis of a challenge-response method, or just one of the two in each case.

In a one embodiment of the data transmission method, the recording unit and the velocity transmitter take their key pairs as a basis for producing a common session key is used for the data transmission for the purpose of producing the authentication information item. Accordingly, the validity of the authentication information item can also be checked with the produced session key. In this case, the session key may in turn also be a symmetric key which is used for authentication in both transmission directions. A symmetric key of this kind can also be generated with a relatively short key length, which requires lower computation power. Associated lower security against compromising the symmetric session key can be avoided by regularly producing a new session key.

In one embodiment, the recording unit can transmit to the velocity transmitter a challenge which, in this case, the velocity transmitter responds to with the session key and transmits to the recording unit. The validity of the ascertained response is accordingly checked by the recording unit with the session key, the processing of the message therefore being dependent on the validity of the ascertained response.

In one embodiment, the session key is produced by the recording unit producing a first random number and signing it with its private key, for example. The signed first random number is encrypted with the public key of the velocity transmitter by the recording unit and transmitted to the velocity transmitter. The velocity transmitter decrypts the encrypted and signed first random number with the private key of said velocity transmitter and checks the signature of the signed first random number with the public key of the recording unit. A validity of the checked signature is taken as a basis for deriving the shared session key from the first random number. By way of example, the first random number can be used directly as both known session keys. Alternatively, the session key can also be derived from the random number in the same way using a method which is known to both parts.

In one embodiment, the production of the session key may involve a second random number being produced by the velocity transmitter and being signed with its private key. In this case, the velocity transmitter encrypts the signed second random number with the public key of the recording unit and transmits said second random number to the recording unit. The recording unit accordingly decrypts the encrypted and signed second random number with its private key and checks the signature of the signed second random number with the public key of the velocity transmitter. The shared session key can in turn be derived from the second random number on the basis of a validity of the checked signature.

In various embodiments, the shared session key can be derived only from the first random number, only from the second random number or both from the first and from the second random number. By way of example, the session key can be ascertained by Exclusive-ORing the first and second random numbers. In the exemplary embodiments described, the shared session key may have a key length of between 80 and 128 bits, for example, and may be based on a symmetric cryptography method such as 3DES or AES.

In one embodiment of a tachograph system, the system has a velocity transmitter and a recording unit that each have a key pair with a public key and a private key and also a certificate derived from the respective key pair and are set up to reciprocally authenticate themselves by means of their public keys and their certificates. In this case, the velocity transmitter is set up to capture sensor data, to produce a digital message from the sensor data and an authentication information item for the message on the basis of the key pair of said velocity transmitter and to transmit the message with the authentication information item to the recording unit. The recording unit is set up to check the authentication information item and to process the message on the basis of a validity of the authentication information item.

A tachograph system of this kind can be used to transmit data between velocity transmitter and recording unit with little computation complexity. In addition, a relatively high level of system security is obtained in comparison with conventional tachograph systems.

In various advantageous embodiments of the tachograph system, the velocity transmitter and the recording unit are set up to perform the respective methods which have been explained previously in the exemplary embodiments for the data transmission method.

BRIEF DESCRIPTION OF DRAWINGS

The invention is explained in more detail below using a plurality of exemplary embodiments with reference to the figures. Elements or method steps which have the same function or action bear the same reference symbols in this case.

In the figures:

FIG. 5 is a flowchart of a data transmission method, and

FIG. 6 is a flowchart of a data transmission method.

DETAILED DESCRIPTION OF THE DRAWINGS

Figure 1:
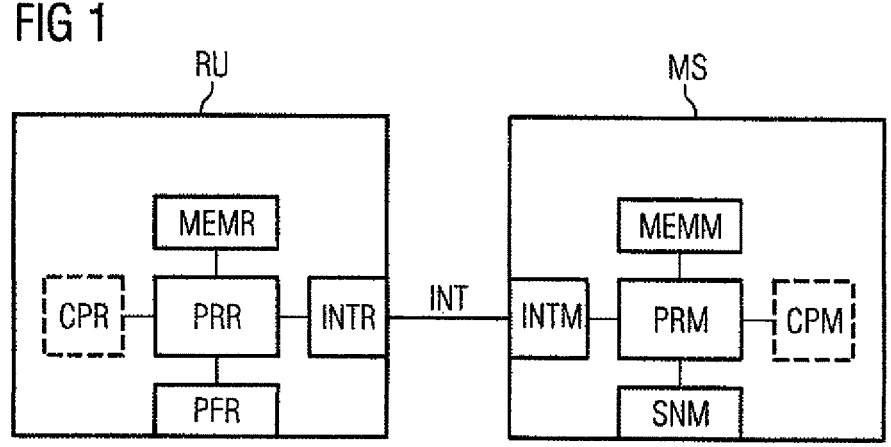
FIG. 1 is a tachograph system with a velocity transmitter and a recording unit.

FIG. 1 shows an exemplary embodiment of a digital tachograph system with a velocity transmitter MS and a recording unit RU, which are connected by an interface INT which is in the form of a cable connection, for example. The recording unit RU has a processor PRR, a memory area MEMR connected thereto, a peripheral unit PFR and optionally a cryptographic coprocessor CPR or a security module. In addition, a communication interface INTR connected to the processor PRR is provided. By way of example, the peripheral unit PFR comprises a card reader, a display, a key pad, external communication interfaces, a printer or printer connection an interface to a CAN bus, and the like.

The velocity transmitter MS similarly comprises a processor PRM, a memory MEMM, a sensor SNM and a communication interface INTM which is connected by the interface INT to the communication interface INTR of the recording unit RU. The velocity transmitter MS may also optionally have a security module or a cryptographic coprocessor CPM. By way of example, the sensor SNM is a Hall sensor which can be used to capture rotation speeds of a drive shaft, for example.

During operation of the arrangement, the velocity transmitter captures sensor data using the sensor SNM, and the processor PRM processes said sensor data and provides it with an authentication information item. This may alternatively take place directly in the processor PRM or in the optional coprocessor CPM. The data and the authentication information item can be output to the recording unit RU via the communication interface INTM. The recording unit RU checks the authentication information item in the processor PRR therein or in the coprocessor CPR, and the data are processed in the processor PRR and stored in the memory MEMR, for example. The stored data can be output to an external evaluation device via the peripheral unit PFR at a later time, for example.

Figure 2:
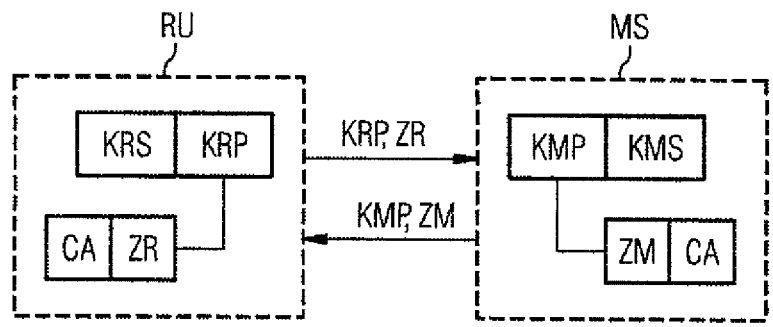
FIG. 2 is a schematic diagram for the interchange of keys and certificates between a recording unit and a velocity transmitter.

With reference to FIG. 2, the velocity transmitter has a public key KMP, a private key KMS and also a certificate ZM which is derived from said key pair KMP, KMS and the validity of which is assured by a certification authority CA. Accordingly, the recording unit RU has a public key KRP, a private key KRS and a certificate ZR derived therefrom which is likewise issued by the certification authority CA.

At least when the velocity transmitter MS and the recording unit RU are connected for the first time, the public key KRP and the certificate ZR of the recording unit RU are transmitted to the velocity transmitter MS, and the public key KMP and the certificate ZM of the velocity transmitter MS are transmitted to the recording unit RU. The certification authority CA allows the velocity transmitter MS and the recording unit RU to check the respective certificate ZR, ZM of the communication partner for validity, so that the validity of the respective public keys KRP, KMP is also assured.

The keys KRS, KRP, KMP, KMS of the recording unit RU and of the velocity transmitter MS are preferably produced using an elliptic curve cryptography system. To this end, the velocity transmitter MS and the recording unit RU have a valid elliptic curve agreed publicly between them which has a particular point stipulated on it. The two communication partners RU, MS secretly obtain or produce a random number which is the basis for the respective private key KRS, KMS of the communication partners. From the private keys KRS, KMS, it is possible to calculate respective public keys KRP, KMP, both of which are situated on the chosen elliptic curve based on the theory of elliptic curves, using the previously stipulated point on the elliptic curve. Such keys can also be used to achieve high levels of security for the cryptography methods when the key length is short.

Following a check on the keys, the interface INT can be used to transmit sensor data between the velocity transmitter MS and the recording unit RU, for example based on one of the subsequently described exemplary methods of data transmission.

Figure 3:
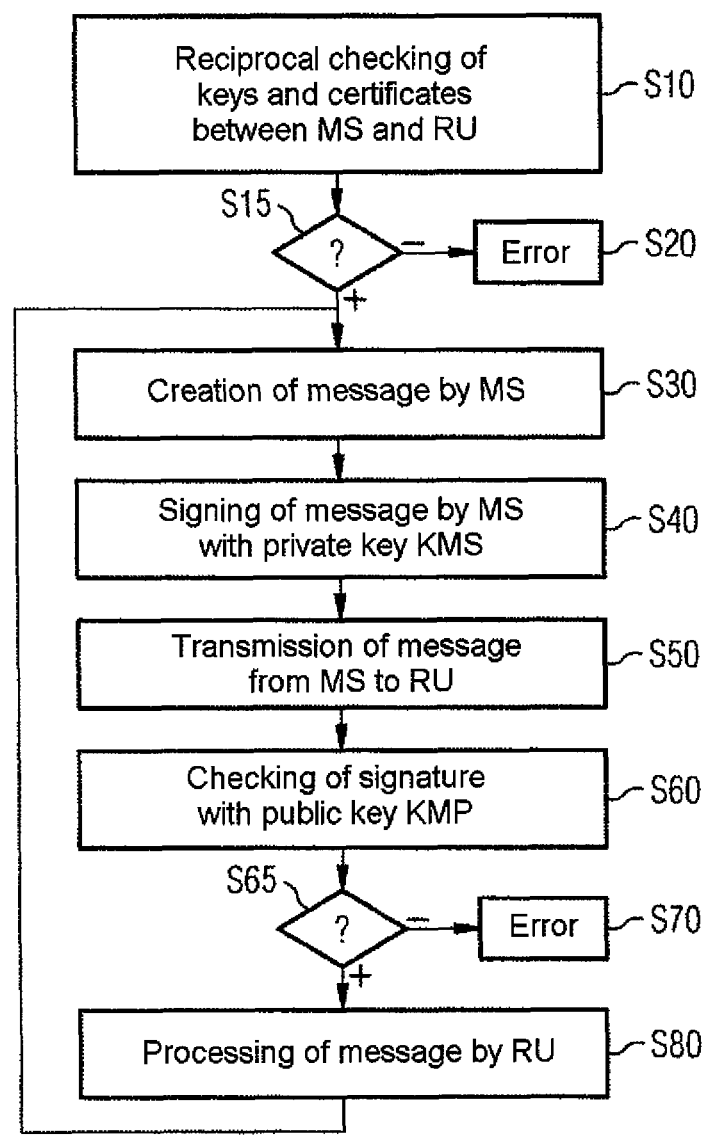
FIG. 3 is a first flowchart of a data transmission method.

FIG. 3 shows an exemplary data transmission method which can preferably be performed in a tachograph system as shown in FIG. 1. As explained with reference to FIG. 2, S10 involves the performance of a reciprocal check on public keys KRP, KMP and certificates ZR, ZM between the velocity transmitter MS and the recording unit RU. If there is a negative result at S15, that is to say that one of the keys KRP, KMP or one of the certificates ZR, ZM is invalid, the process is terminated at S20 with an error.

If the check is positive, S30 involves the velocity transmitter MS capturing sensor data and producing a digital message from the sensor data.

At S40, the digital message is signed with the private key KMS of the velocity transmitter MS, which is known only to the velocity transmitter MS. After S40, there accordingly exist a signed message or a message and an associated signature. These are transmitted from the velocity transmitter MS to the recording unit RU at S50.

At S60, the recording unit RU checks the signature or the signed message with the public key KMP of the velocity transmitter MS as authentication information item. If the authentication at S65 has failed, the process is again terminated at S70 with an error. Otherwise, S80 involves the authenticated message being processed by the recording unit RU. The method can then be continued at S30 by further sensor data being picked up and a further message being created by the velocity transmitter MS.

Figure 4:
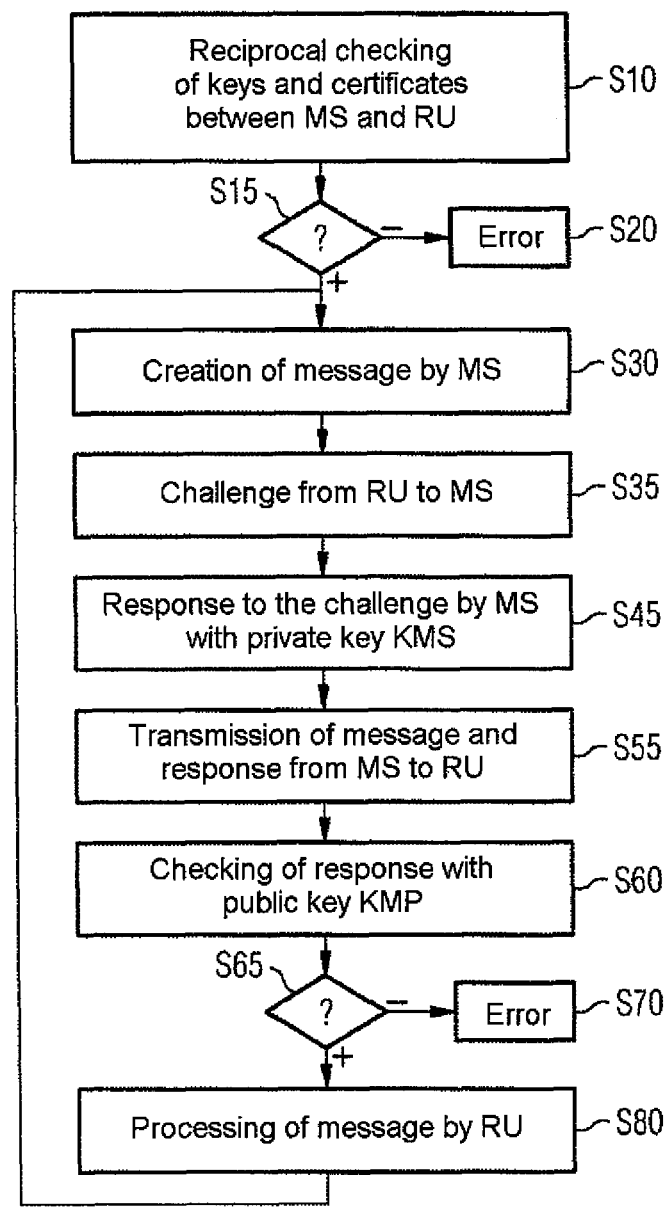
FIG. 4 is a flowchart of a data transmission method.

FIG. 4 shows a further exemplary embodiment of a data transmission method. The blocks S10, S15, S20, S30 essentially correspond in terms of their function to the blocks shown in FIG. 3.

At S35, the recording unit RU transmits a challenge to the velocity transmitter MS. Said challenge receives a response at S45 from the velocity transmitter MS with its private key KMS and is transmitted to the recording unit RU together with the message at S55. The authentication information item is therefore provided by the challenge which receives a response with the private key KMS. In other words, a challenge-response method is used for the authentication between the velocity transmitter MS and the recording unit RU. Such authentication can also be referred to as a challenge-response protocol.

At S60, the authentication information item in the form of the response is checked with the public key KMP of the velocity transmitter MS by the recording unit RU.

The blocks S65, S70, S80 again correspond to the exemplary embodiment shown in FIG. 3.

FIG. 5 shows a further exemplary embodiment of the data transmission method for a tachograph system. The blocks S10, S15, S20 correspond in their functionality to the respective blocks from FIGS. 3 and 4. At S25, the public and private keys of the recording unit RU and of the velocity transmitter MS are taken as a basis for producing a shared session key KS. By way of example, at least one of the communication partners MS, RU is able to produce a random number Z1, Z2 and sign it with its own respective private key. Next, the signed random number is encrypted with the public key of the respective other communication partner, and the encrypted and signed random number is transmitted to said communication partner. The other communication partner can decrypt the encrypted signed random number with the private key of said communication partner and check it for authenticity with the public key of the other communication partner that signed the random number. By way of example, this is done by checking the signature on the basis of the appropriately applied cryptographic method. At this time, the one random number or the two random numbers Z1, Z2 produced by the communication partners MS, RU is/are known to the two communication partners MS, RU, so that the one or the two random numbers Z1, Z2 can be used to derive the shared session key KS.

In one exemplary embodiment, the one produced random number Z1, Z2 is the shared session key KS directly. If both communication partners MS, RU have produced a respective random number Z1, Z2, the shared session key KS can preferably be derived by Exclusive-ORing the first random number Z1 with the second random number Z2. In both cases, however, it is alternatively also possible to use an additional value for ascertaining the shared session key KS from the random numbers Z1, Z2.

At S30, as described previously in FIGS. 3 and 4, a message is produced from sensor data by the velocity transmitter MS. At S40', authentication information for the message produced is created by the velocity transmitter MS. This is done with the shared session key KS.

The message with the authentication information item or the message and the authentication information item is/are transmitted from the velocity transmitter MS to the recording unit RU at S50, and checked for validity by the recording unit at S60', in a similar manner to that described previously for FIG. 3. The authentication information item is checked for validity with the session key KS.

The further procedure and processing of the message in the blocks S65, S70, S80 corresponds to the exemplary embodiments described previously in FIG. 3 and FIG. 4.

A further exemplary embodiment of a data transmission method is shown in FIG. 6. As described in the previous exemplary embodiment relating to FIG. 5, the blocks S10, S15, S20, S25 involve reciprocal checking of the public keys KMP, KRP and certificates ZR, ZM and also the production of a shared symmetric session key KS being performed.

With reference to the previous embodiments, S30 in turn involves the creation of a message from sensor data by the velocity transmitter. in a similar manner to in the case of the exemplary embodiment in FIG. 4, the recording unit RU transmits a challenge to the velocity transmitter MS, said challenge receiving a response from the velocity transmitter MS with the shared session key KS at S45. The message and the response are in turn transmitted from the velocity transmitter MS to the recording unit RU at S55. In other words, the message is authenticated using a challenge-response protocol.

The validity of the response is checked at S60' by the recording unit RU, which can likewise ascertain the response from the challenge presented by it, using the shared session key KS, which was also used to produce the authentication information item.

With the decision about the procedure on the basis of the validity and the processing of the message, the functionality of the blocks S65, S70, S80 corresponds to the exemplary embodiments described in FIGS. 3, 4, and 5.

In the various embodiments described for the data transmission method, the recording unit RU and the velocity transmitter MS each have an asymmetric key pair with a public and a private key. Even if the computation capacity of the velocity transmitter MS and of the recording unit RU is relatively low, the key length of these keys can be chosen to be relatively high if a shared session key KS is produced for authenticating the messages. This is because the shared session key is produced only at particular times and not for every single message between velocity transmitter MS and recording unit RU. By way of example, the session key is produced in the case of an initializing connection between velocity transmitter MS and recording unit RU. To increase the system security, it is possible to negotiate a respective new session key between the communication partners MS and RU in each case after a predetermined time or on the basis of a number of messages. Preferably, the asymmetric key pairs are based on an elliptic curve cryptography system.

Although a cryptography method may also involve encryption of data, as is done in the present exemplary embodiments for the transmission of the random numbers Z1, Z2 when the session key KS is produced, the transmission of the messages merely involves authentication information being sent at the same time. The message can be transmitted in unencrypted form. This reduces the computation complexity for producing and transmitting the message. In addition, legal export regulations which prohibit the use of encryption technologies can be complied with. Nevertheless, when needed, it is also possible to encrypt the messages between velocity transmitter MS and recording unit RU, but this should be done without dispensing with the authentication information item.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A data transmission method for a tachograph system for transmission of digital messages between a velocity transmitter and a recording unit each having a respective key pair with a public key and a private key and a certificate derived from the respective key pair, the method comprising:
    transmitting the velocity transmitter public key and the velocity transmitter certificate from the velocity transmitter to the recording unit;
    transmitting the recording unit public key and the recording unit certificate from the recording unit to the velocity transmitter;
    checking the velocity transmitter public key and the velocity transmitter certificate by the recording unit;
    checking the recording unit public key and the recording unit certificate by the velocity transmitter;
    capturing sensor data by the velocity transmitter;
    producing a digital message by the velocity transmitter from the sensor data;
    producing authentication information item for the digital message by the velocity transmitter based on its key pair;
    transmitting the message and the authentication information item from the velocity transmitter to the recording unit; and
    processing the message in the recording unit based a validity of the authentication information item as checked by the recording unit.

2. The data transmission method as claimed in claim 1, wherein the respective key pairs of the recording unit and the velocity transmitter are based on an elliptic curve cryptography system.

3. The data transmission method as claimed in claim 2, wherein the respective certificates of the recording unit and of the velocity transmitter are produced by a certification authority known to the recording unit and to the velocity transmitter.

4. The data transmission method as claimed in claim 1, wherein the respective certificates of the recording unit and the velocity transmitter are produced by a certification authority known to both the recording unit and the velocity transmitter.

5. The data transmission method as claimed in claim 1, wherein the production of the authentication information item comprises the message being signed with the velocity transmitter private key.

6. The data transmission method as claimed in claim 5, wherein the validity of the authentication information item is checked with the velocity transmitter public key.

7. The data transmission method as claimed in claim 1, further comprising:
    transmitting a challenge from the recording unit to the velocity transmitter;
    ascertaining a response transmitted from the velocity transmitter to the recording unit from the challenge by the velocity transmitter with its private key; and
    ascertaining a validity of the response by the recording unit with the velocity transmitter public key;

wherein the processing of the message is dependent on the validity of the ascertained response.

8. The data transmission method as claimed in claim 1, further comprising producing a shared session key by the recording unit and the velocity transmitter using their respective key pairs for producing the authentication information item.

9. The data transmission method as claimed in claim 8, wherein the validity of the authentication information item is checked with the session key.

10. The data transmission method as claimed in claim 9, further comprising
transmitting a challenge from the recording unit to the velocity transmitter;
ascertaining a response by the velocity transmitter from the challenge with the session key transmitted from the velocity transmitter to the recording unit; and
checking a validity of the ascertained response is by the recording unit with the session key,
wherein and the processing of the message is dependent on the validity of the ascertained response.

11. The data transmission method as claimed in claim 8, in which the production of the session key comprises:
producing a first random number by the recording unit;
signing, by the recording unit, the first random number with the recording unit private key;
encrypting the signed first random number with the velocity transmitter public key by the recording unit;
transmitting the encrypted and signed first random number from the recording unit to the velocity transmitter;
decrypting the encrypted and signed first random number by the velocity transmitter;
checking of the signature of the signed first random number with the recording unit public key by the velocity transmitter; and
derivation of the shared session key from the first random number on the basis of a validity of the checked signature.

12. The data transmission method as claimed in claim 8, wherein the production of the session key comprises:
producing a second random number by the velocity transmitter;
signing the second random number with the velocity transmitter private key by the velocity transmitter;
encrypting the signed second random number with the recording unit public key by the velocity transmitter;
transmitting the encrypted and signed second random number from the velocity transmitter to the recording unit;
decrypting the encrypted and signed second random number with the recording unit private key by the recording unit;
checking the signature of the signed second random number with the velocity transmitter public key by the recording unit; and
deriving the shared session key from the second random number based on the validity of the checked signature.

13. The data transmission method as claimed in claim 8, wherein the production of the authentication information item is based on a symmetric cryptographic method.

14. A tachograph system comprising a velocity transmitter and a recording unit each having a respective key pair comprising a public key and a private key and a certificate derived from the respective key pair to reciprocally authenticate themselves by their public keys and their certificates, wherein the velocity transmitter configured to:
check the public key and the certificate of the recording unit;
capture sensor data;
produce a digital message from the sensor data and an authentication information item for the message on the basis of the key pair of said velocity transmitter, and
transmit the message with the authentication information item to the recording unit; and
the recording unit configured to:
check the public key and the certificate of the velocity transmitter;
check the authentication information item; and
process the message on the basis of a validity of the authentication information item.

15. The tachograph system as claimed in claim 14, wherein the key pairs of the recording unit and of the velocity transmitter are based on an elliptic curve cryptography system.

* * * * *